(12) United States Patent
Negishi et al.

(10) Patent No.: US 12,540,257 B2
(45) Date of Patent: Feb. 3, 2026

(54) HOT-MELT PRESSURE-SENSITIVE ADHESIVE COMPOSITION AND HOT-MELT PRESSURE-SENSITIVE ADHESIVE SHEET

(71) Applicant: NITTO DENKO CORPORATION, Ibaraki (JP)

(72) Inventors: Nobukazu Negishi, Ibaraki (JP); Itsuhiro Hatanaka, Ibaraki (JP); Hiroaki Takahashi, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 702 days.

(21) Appl. No.: 17/800,628

(22) PCT Filed: Feb. 17, 2021

(86) PCT No.: PCT/JP2021/005861
§ 371 (c)(1),
(2) Date: Aug. 18, 2022

(87) PCT Pub. No.: WO2021/166937
PCT Pub. Date: Aug. 26, 2021

(65) Prior Publication Data
US 2023/0096432 A1 Mar. 30, 2023

(30) Foreign Application Priority Data
Feb. 19, 2020 (JP) ................. 2020-026123

(51) Int. Cl.
*C09J 7/35* (2018.01)
*C09J 7/38* (2018.01)
(Continued)

(52) U.S. Cl.
CPC ................. *C09J 7/385* (2018.01); *C09J 7/35* (2018.01); *C09J 11/06* (2013.01); *C09J 133/10* (2013.01);
(Continued)

(58) Field of Classification Search
CPC ..... C09J 7/385; C09J 7/35; C09J 11/06; C09J 133/10; C09J 2301/312; C09J 2301/408; C09J 2301/302; C09J 2301/304
(Continued)

(56) References Cited

U.S. PATENT DOCUMENTS

2010/0040777 A1 2/2010 Yamaguchi et al.
2013/0190457 A1 7/2013 Prenzel et al.
(Continued)

FOREIGN PATENT DOCUMENTS

CN 103380189 A 10/2013
CN 105985711 A 10/2016
(Continued)

OTHER PUBLICATIONS

Search Report issued Jan. 15, 2024 in Chinese Application No. 2021800154629.
(Continued)

*Primary Examiner* — Joseph S Del Sole
*Assistant Examiner* — Ronald Grinsted
(74) *Attorney, Agent, or Firm* — Sughrue Mion, PLLC

(57) ABSTRACT

Provided is a hot-melt pressure-sensitive adhesive composition which enables to form a pressure-sensitive adhesive layer without allowing the progression of rapid gelation at the time of heating and melting. The pressure-sensitive adhesive composition provided by the present invention is a (Continued)

solvent-free hot-melt pressure-sensitive adhesive composition. The pressure-sensitive adhesive composition includes a base polymer, an isocyanate crosslinking agent, and a tackifier A represented by the following general formula (1):

$$R\text{—}[(CH_3)_2C_6H_2\text{—}(CH_2O)_n\text{—}CH_2]_m\text{—}OH \qquad (1)$$

(in the general formula (1), R is a hydrogen atom or a hydroxyl group, m is 9 to 16, and n is 0 to 3). A content of the tackifier A with respect to 100 parts by weight of the base polymer is 1 part by weight to 10 parts by weight.

4 Claims, 1 Drawing Sheet

(51) Int. Cl.
*C09J 11/06* (2006.01)
*C09J 133/10* (2006.01)

(52) U.S. Cl.
CPC .... *C09J 2301/302* (2020.08); *C09J 2301/304* (2020.08); *C09J 2301/312* (2020.08); *C09J 2301/408* (2020.08)

(58) Field of Classification Search
USPC .......................................................... 524/196
See application file for complete search history.

(56) References Cited

U.S. PATENT DOCUMENTS

2013/0331521 A1  12/2013  Funaoka et al.
2017/0232720 A1   8/2017  Nishikawa et al.

FOREIGN PATENT DOCUMENTS

| CN | 109666434 A | | 4/2019 |
| JP | 9-78043 A | | 3/1997 |
| JP | 9-302322 A | | 11/1997 |
| JP | 2002146302 A | * | 5/2002 |
| JP | 2003-119234 A | | 4/2003 |
| JP | 2008-031437 A | | 2/2008 |
| JP | 2013-147655 A | | 8/2013 |
| JP | 2015189842 A | * | 11/2015 |

OTHER PUBLICATIONS

Extended European Search Report issued Feb. 2, 2024 in Application No. 21757407.8.
Notice of Reasons for Refusal issued Feb. 22, 2024 in JP Application No. 2020-026123.
International Search Report of PCT/JP2021/005861 dated Apr. 20, 2021 [PCT/ISA/210].

* cited by examiner

HOT-MELT PRESSURE-SENSITIVE ADHESIVE COMPOSITION AND HOT-MELT PRESSURE-SENSITIVE ADHESIVE SHEET

CROSS REFERENCE TO RELATED APPLICATIONS

This application is a National Stage of International Application No. PCT/JP2021/005861, filed Feb. 17, 2021, claiming priority to Japanese Patent Application No. 2020-026123, filed Feb. 19, 2020.

TECHNICAL FIELD

The present invention relates to a hot-melt pressure sensitive adhesive composition. The present invention, in particular, relates to a pressure-sensitive adhesive sheet which includes a pressure-sensitive adhesive layer formed of the hot-melt pressure-sensitive adhesive composition.

BACKGROUND ART

In general, pressure-sensitive adhesive (hereinafter, referred to as PSA) exists as a soft solid (viscoelastic material) in a room temperature range and has a property to adhere easily to an adherend with pressure. With such property, PSA is widely used in various industrial fields from home electric appliances to automobiles and OA equipment as a highly reliable bonding means having a favorable workability.

PSA is typically formed in the form of a film by using a PSA composition, and is used in the form of a PSA sheet which includes the PSA in the form of a film (a PSA layer). For manufacturing the PSA sheet having such configuration, generally, a PSA composition of a solvent solution such as toluene solution is used, and the PSA layer is formed by the solvent solution being coated on a suitable surface. However, in recent years, restraining of the use of solvents has been sought for preservation of the environment, and even in the formation of the PSA layer, use of a solvent-free hot-melt PSA composition has been reviewed. Technical literature related to this type of PSA include Patent Document 1.

CITATION LIST

Patent Literature

[Patent Document 1] Japanese Patent Application Publication No. 2013-147655

SUMMARY OF INVENTION

Technical Problem

A crosslinking agent may be added to a PSA composition with the purpose of improving the adhesive performance of the PSA layer. In a case of forming a PSA layer by using a PSA composition used in a conventional solution form, by heating the PSA composition containing the crosslinking agent after being formed as a film by coating, the PSA layer may be formed by the crosslinking reaction and drying progressing simultaneously.

Whereas, in a case of forming a PSA layer by using a solvent-free hot-melt PSA composition, the hot-melt PSA composition is formed as a film in a state of being melted by heating. However, when the holt-melt PSA composition having a crosslinking agent added thereto is heated until attaining a melted state in which the composition has an adequate fluidity, a reaction of the crosslinking agent added to the composition progresses, and sometimes a gelled substance is generated rapidly in the PSA composition. Thus, when gelling progresses at a stage of melting by heating the PSA composition, it may be a factor contributing to a trouble developing in a process of forming the film thereafter, a degradation of uniformity of thickness of the PSA layer and even the PSA sheet, and a poor appearance.

The present invention has been made in view of the abovementioned circumstances with an objective to provide a hot-melt PSA composition that enables formation a PSA layer without the gelling progressing rapidly at the time of being melted by heating. Other related objective of the present invention is to provide a PSA sheet obtained by using the hot-melt PSA composition.

Solution to Problem

According to this description, there is provided a hot-melt PSA composition which is solvent-free. The hot-melt PSA composition includes a base polymer, an isocyanate crosslinking agent, and a tackifierA. Here, the tackifierA is represented by the following general formula (1):

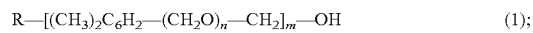

$$R\text{—}[(CH_3)_2C_6H_2\text{—}(CH_2O)_n\text{—}CH_2]_m\text{—}OH \quad (1);$$

(in the general formula (1), R is a hydrogen atom or a hydroxyl group, m is 9 to 16, and n is 0 to 3). A content of the tackifier A with respect to 100 parts by weight of the base polymer, is 1 part by weight to 10 parts by weight.

In the hot-melt PSA composition, the progression of rapid gelling at the time of being melted by heating may be suppressed. When such hot-melt PSA composition is used, a defect in formation at the time of molding the composition in the film form is suppressed, and moreover, the uniformity in thickness is improved, and there is a tendency that a PSA layer having a favorable appearance is achieved. Moreover, when this hot-melt PSA composition is used, it is easy to achieve a PSA layer showing a favorable adhesive performance.

In a preferable embodiment of the art disclosed herein, the hot-melt PSA composition contains an acrylic polymer as the base polymer. In this PSA composition having such configuration, it is easy to form a PSA layer having a favorable adhesive performance when used in the hot-melt form.

In a preferable embodiment of the art disclosed herein, in the acrylic polymer, an alkyl (meth)acrylate having an alkyl group with 4 or more and 12 or less carbon atoms at its ester terminus is polymerized in a proportion of 50% by weight or higher. When this acrylic polymer is used, it is easy to form a PSA layer which shows a favorable adhesive performance by being used in a hot-melt form.

In a preferable embodiment of the art disclosed herein, a degree of dispersion (Mw/Mn) of the acrylic polymer is 3.0 or more and 9.0 or less. When the acrylic polymer having this degree of dispersion is used, it is easy to form a PSA layer which shows a favorable adhesive performance by being used in a solvent-free hot-melt form.

In a preferable embodiment of the art disclosed herein, a content of the isocyanate crosslinking agent is 2 parts by weight or more and 10 parts by weight or less with respect to 100 parts by weight of the base polymer. According to this configuration, there can be further improvement in an effect of suppressing the gelling at the time of the PSA composition being melted by heating.

According to this description, there is provided a PSA sheet having a PSA layer formed of any one of the PSA compositions disclosed herein. According to this configuration, a PSA sheet having a favorable adhesive strength while having an improved uniformity in thickness and appearance can be achieved easily. Moreover, the PSA sheet of this configuration would help reducing environmental burden.

The scope of the invention for which the present patent application seeks patent protection includes a suitable combination of the respective features described above.

DESCRIPTION OF EMBODIMENTS

Figure 1:
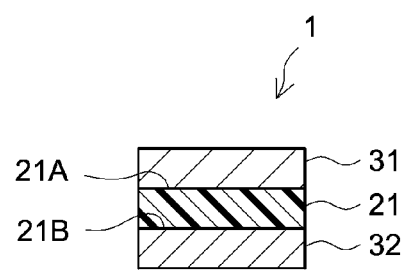
FIG. 1 shows a cross-sectional diagram schematically illustrating the PSA sheet according to an embodiment.

Preferable embodiments of the present invention are described below. Matters necessary to practice in this invention other than those specifically referred to in this Description can be understood by a person skilled in the art on the basis of the disclosure about implementing the invention in this Description and common technical knowledge at the time the application was filed. The present invention can be practiced on the basis of the contents disclosed in this Description and common technical knowledge in the subject field. In the following drawings, members or parts having the same function may be described with the same symbols allocated and the redundant description may be omitted or simplified. Moreover, the embodiments illustrated in the drawings are schematic in order to clearly describe the present invention and the drawings do not accurately represent the size or scale of products actually provided.

<PSA Composition>

The PSA composition disclosed herein is a PSA composition which is solvent-free. Here, in this Description, the 'hot-melt PSA composition' refers to a PSA composition which is used in a hot melt (thermal fusion) form at the time of forming the PSA layer. Moreover, in this Description, the "solvent-free" signifies not containing a solvent practically. The PSA composition in the present Description is "solvent-free" or "not including a solvent practically" implies that the solvent content of the PSA composition is 1% by weight or less, or more preferably, 0.1% by weight or less, and even more preferably 0.01% by weight or less, and also includes a case of the solvent content of 0% by weight. In this Description, the hot-melt PSA composition may be simply referred to as 'NA composition'.

<Base Polymer>

The PSA composition disclosed herein includes a base polymer. The species of the base polymer is not particularly limited. The PSA composition disclosed herein may be a PSA composition which comprises as the base polymer (i.e. a component accounting for 50% by weight or more of polymer components), one species, or two or more than two species selected from various polymers showing rubber elasticity in a room temperature range, with examples including acrylic polymers, rubber polymers (natural rubber polymers, synthetic rubber polymers, and a mixture thereof), polyester polymers, urethane polymers, polyether polymers, silicone polymers, polyamide polymers, and fluorine polymers.

(Glass Transition Temperature (Tg))

The base polymer included in the PSA composition disclosed herein, for instance, can be set to be such that a glass transition temperature (Tg) calculated on the basis of a composition of a monomer component forming the base polymer is below 0° C. Here, the Tg calculated on the basis of the monomer component refers to Tg calculated from the Fox equation based on the composition of the monomer component. The Fox equation, as shown below, is a relational expression between the Tg of a copolymer and glass transition temperatures Tgi of homopolymers obtained by homopolymerization of the respective monomers constituting the copolymer.

$$1/Tg = \Sigma(Wi/Tgi)$$

In the Fox equation, Tg represents the glass transition temperature (unit: K) of the copolymer, Wi represents the weight fraction (copolymerization ratio by weight) of a monomer i in the copolymer, and Tgi represents the glass transition temperature (unit: K) of homopolymer of the monomer i.

As for the glass transition temperature of homopolymers used for calculating Tg, values listed in a known document are used. In particular, values are given in "Polymer Handbook" (r edition, John Wiley & Sons, Inc., Year 1989). With respect to a monomer for which several values are given in Polymer Handbook, the highest value is used. For glass transition temperatures of homopolymers whose corresponding monomers are not listed in Polymer Handbook, values obtained by the measurement method described in Japanese Patent Application Publication No. 2007-51271 can be used.

Tg which is calculated on the basis of the composition of monomers may be obtained as Tg of a polymer of the monomers (typically, the base polymer in the PSA composition disclosed herein). Tg of the polymer can be preferably −10° C. or lower, or may be −20° C. or lower, −30° C. or lower, or even −40° C. or lower. As Tg becomes low, tightness of adhesion to the adherend tend to improve. In some embodiments, Tg of the polymer may be −50° C. or lower, −55° C. or lower, or even −60° C. or lower. Although lower limit of Tg of the polymer is not restricted, from the viewpoint of improving the cohesion of the PSA layer and ease of procuring materials, normally, −80° C. or higher is suitable, and it is preferable to be −70° C. or higher.

(Acrylic Polymer)

The PSA composition disclosed herein can be favorably made in the form of a (meth)acrylic monomer with 50% by weight or more the monomer component. It is preferable that the PSA composition disclosed herein is a PSA composition containing an acrylic polymer which is a polymer of the monomer component as the base polymer, that is, the acrylic PSA composition. The PSA compositions according to some preferred embodiments may be an acrylic polymer with over 70% by weight, over 80% by weight, or over 90% by weight, from among the polymer components in the composition. 95% by weight or more or 98% by weight or more of the polymer components may be an acrylic polymer.

In this Description, the term "acrylic polymer" refers to a polymer having monomeric units derived from a (meth)acrylic monomer in a polymer structure, and typically refers to a polymer containing over 50% by weight monomer units derived from a (meth)acrylic monomer. Moreover, in this Description, the term "(meth)acrylic monomer" refers to a monomer having at least one (meth)acrylic acryloyl group in one molecule. Here, the term "(meth)acryloyl group" collectively refers to an acryloyl group and a methacryloyl group. Therefore, the concept of "(meth)acrylic monomer" as referred to herein may encompass both a monomer (an acrylic monomer) having an acryloyl group and a monomer (a methacrylic monomer) having a methacryloyl group Similarly, in this Description, the term "(meth)acrylic acid" collectively refers to an acrylic acid and a methacrylic acid, and the term "(meth)acrylate" collectively refers to an acrylate and a methacrylate respectively.

The acrylic polymer, for instance, may be a polymer containing 50% by weight or more of monomer units derived from an alkyl (meth)acrylate, that is, a polymer in which an alkyl (meth)acrylate accounts for 50% by weight or more of of the total amount of monomer components for preparing the acrylic polymer. As the alkyl (meth)acrylate, an alkyl (meth)acrylate having a linear or branched alkyl group with 1 to 20 carbons (that is $C_{1-20}$) at its ester terminus may be used preferably. For easy balancing of properties, of the total amount of monomer components, the proportion of the $C_{1-20}$ alkyl (meth)acrylate may be, for instance, 50% by weight or more, preferably 60% by weight or more, or more preferably 70% by weight or more. For the same reason, of the total of monomer components, the proportion of $C_{1-20}$ alkyl (meth)acrylate may be, for instance, 99.9% by weight or less, preferably 98% by weight or less, and more preferably 95% by weight or less. In some embodiments, of the total amount of monomer components, the proportion of $C_{1-20}$ alkyl (meth)acrylate may be, for instance, 80% by weight or less, or even 85% by weight or less.

Non-limiting specific examples of the $C_{1-20}$ alkyl (meth)acrylate include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate.

Among these, it is preferable to use at least $C_{1-18}$ alkyl (meth)acrylate, and it is more preferable to use at least $C_{1-14}$ alkyl (meth)acrylate. In some embodiments, the acrylic polymer may include, as a monomeric unit, at least one species selected from $C_{4-12}$ alkyl (meth)acrylates (preferably $C_{4-10}$ alkyl (meth)acrylate). For example, the acrylic polymer which includes one or both of n-butyl acrylate (BA) and 2-ethylhexyl acrylate (2EHA) is preferable. Examples of other $C_{1-18}$ alkyl (meth)acrylates that may be used preferably include methyl acrylate, methyl methacrylate (MMA), n-butyl methacrylate (BMA), 2-ethylhexyl methacrylate (2EHMA), and isostearyl acrylate (ISTA). Preferred examples of the acrylic polymers include acrylic polymers which include at least one species of $C_{4-8}$ alkyl (meth)acrylate as the monomeric units, acrylic polymers which include at least one species of $C_{4-6}$ alkyl (meth)acrylate as the monomeric units, and acrylic polymers which include at least one species of $C_{6-10}$ alkyl (meth)acrylate as the monomeric units.

The monomer units forming the acrylic polymer may include in addition to the alkyl (meth)acrylate as the primary component, another secondary monomer (copolymerizable monomer) that can be copolymerized with the alkyl (meth)acrylate according to the requirement. As the secondary monomer, a monomer having a functional group (such as a carboxyl group, a hydroxy group, an amide group, and the like) can be used preferably. The monomer having a functional group may be useful for introducing a cross-linking point into the acrylic polymer or increasing cohesive strength of the acrylic polymer.

As the secondary monomer, for example, the following functional group-containing monomers can be used solely or in combination of two or more.

Hydroxyl group-containing monomers: for example, hydroxyalkyl (meth)acrylates such as 2-hydroxyethyl (meth)acrylate, 2-hydroxypropyl (meth)acrylate, 3-hydroxypropyl (meth)acrylate, 4-hydroxybutyl (meth)acrylate, and (4-hydroxymethyl cyclohexyl) methyl (meth)acrylate, unsaturated alcohols such as vinyl alcohol and allyl alcohol, and ether compounds such as 2-hydroxyethyl vinyl ether, 4-hydroxybutyl vinyl ether, and diethylene glycol monovinyl ether.

Carboxyl group-containing monomers: for example, ethylene unsaturated monocarboxylic acids such as acrylic acid (AA), methacrylic acid (MAA), crotonic acid, and isocrotonic acid; and ethylene unsaturated dicarboxylic acids such as maleic acid, fumaric acid, itaconic acid, citraconic acid, and the like.

Acid anhydride group-containing monomers: for example, maleic anhydride and itaconic anhydride.

Monomers having a nitrogen atom-containing ring: for example, N-vinyl-2-pyrrolidone, methyl-N-vinylpyrrolidone, vinylpyridine, vinylpyrazine, vinylpyrimidine, N-vinylpiperidone, N-vinylpiperazine, N-vinylpyrol, N-vinylimidazole, N-vinyloxazole, N-vinylmorpholine, N-vinyl-3-morpholinone, N-vinyl-2-caprolactam, 3-oxazin-2-one, N-vinyl-3,5-morpholinedione, N-vinylpyrazole, N-vinylisoxazole, N-vinylthiazole, N-vinylisothiazole, N-(meth)acryloylmorpholine, N-(meth)acxyloyl-2-pyrrolidone, N-(meth)acryloylpiperidine, and N-(meth)acryloylpyrrolidine.

Amido group-containing monomers: for example, (meth)acrylamides; N,N-dialkyl (meth)acrylamides such as N—N-dimethyl (meth)acrylamide, N,N-diethyl (meth)acrylamide, N—N-dipropyl (meth)acrylamide, N,N-diisopropyl (meth)acrylamide, N,N-di(n-butyl) (meth)acrylamide, N, N-di(t-butyl) (meth)acrylamide and the like; N-alkyl (meth)acrylamides such as N-ethyl (meth)acrylamide, N-isopropyl (meth)acrylamide, N-butyl (meth)acrylamide, N-n-butyl (meth)acrylamide, and the like; N-vinyl carboxylic acid amides such as N-vinyl acetamide, and the like; monomers having a hydroxy group and an amide group, for example, N-hydroxyalkyl (meth)acrylamides such as N-(2-hydroxyethyl) (meth)acrylamide, N-(2-hydroxypropyl) (meth)acrylamide, N-(1-hydroxypropyl) (meth)acrylamide, N-(3-hydroxypropyl) (meth)acrylamide, N-(2-hydroxybutyl) (meth)alkylamide, N-(3-hydroxybutyl) (meth)acrylamide, N-(4-hydroxybutyl) (meth)acrylamide, and the like; monomers having an alkoxy group and an amide group, for example, N-alkoxyalkyl (meth)acrylamides such as N-methoxymethyl (meth)acrylamide, N-methoxyethyl (meth)alkylamide, N-butoxymethyl (meth)acrylamide, and the like; N-dialkylaminoalkyl (meth)acrylamides such as N,N-dimethylaminopropyl (meth)acrylamide, and the like.

Amino group-containing monomers: for example, aminoethyl (meth)acrylate, N,N-dimethyl aminoethyl (meth)acrylate, and t-butyl aminoethyl (meth)acrylate.

Monomers having a succinimide skeleton: for example, N-(meth)acryloyloxy methylene succinimide, N-(meth)acryloyl-6-oxy hexamethylene succinimide, N-(meth)acryloyl-8-oxy hexamethylene succinimide, and the like.

Maleimides: for example, N-cyclohexyl maleimide, N-isopropyl maleimide, N-lauryl maleimide, N-phenylmaleimide, and the like.

Itaconimides: for example, N-methyl itaconimide, N-ethyl itaconimide, N-butyl itaconimide, N-octyl itaconimide, N-2-ethyl hexyl itaconimide, N-cyclohexyl itaconimide, N-lauryl itaconimide, and the like.

Epoxy group-containing monomers: for example, glycidyl (meth)acrylate, methyl glycidyl (meth)acrylate, and allyl glycidyl ether.

Cyano group-containing monomers: for example, acrylonitrile and methacrylonitrile.

Keto group-containing monomers: for example, diacetone (meth)acrylamide, diacetone (meth)acrylate, vinyl methyl ketone, vinyl ethyl ketone, allyl acetoacetate, and vinyl acetoacetate.

Alkoxysilyl group-containing monomers: for example, alkoxysilyl group-containing (meth)acrylates such as 3-(meth)acryloxypropyl trimethoxysilane, 3-(meth)actyloxypropyl triethoxysilane, 3-(meth)acryloxypropyl methyl dimethoxysilane, 3-(meth)acryloxypropyl methyl diethoxysilane, and the like; and alkoxysilyl group-containing vinyl compounds such as vinyl trimethoxysilane, vinyl triethoxysilane, and the like.

Amino group-containing monomers: for examples, aminoethyl (meth)acrylate, N,N-dimethyl aminoethyl (meth)acrylate, and t-butyl aminoethyl (meth)acrylate.

Monomers containing sulfonic acid group or phosphoric acid group: for example, styrene sulfonic acid, allyl sulfonic acid, sodium vinyl sulfonic acid, 2-(meth)acrylamide-2-methyl propane sulfonic acid, (meth)acrylamide propane sulfonic acid, sulfopropyl (meth)acrylate, (meth)acryloyl oxynaphthalene sulfonic acid, 2-hydroxyethyl acryloyl phosphate and the like.

Isocyanate group-containing monomers: for example, 2-isocyanatoethyl (meth)acrylate, (meth)acryloyl isocyanate, m-isopropenyl-α, and α-dimethyl benzyl isocyanate.

In a case of using the abovementioned functional-group containing monomer, an amount thereof to be used is not particularly limited, and it is usually appropriate to use 0.01% by weight or more of the total amount of monomer components. From the viewpoint of better exhibiting effects of using the functional group-containing monomer, the amount of the functional group-containing monomer used may be 0.1% by weight or more or 1% by weight or more of the total amount of the monomer components. Moreover, the amount of the functional group-containing monomer used can be 50% by weight or less of the total amount of the monomer components, and it is preferable to make the amount 40% by weight or less. Accordingly, it is possible to prevent the cohesive force of the PSA from becoming excessively high, and to improve the tight adhesiveness to the adherend.

The PSA composition disclosed herein can be preferably carried out in an embodiment in which the above-mentioned monomer component contains $C_{4-10}$ alkyl (meth)acrylate, and further contains one or both of acrylic acid-containing monomer and a hydroxy group-containing monomer. As the hydroxy group-containing monomer, hydroxyalkyl (meth)acrylate can be preferably adopted. A hydroxy $C_{1-4}$ alkyl acrylate such as 2-hydroxyethyl acrylate (HEA), 4-hydroxybutyl acrylate (4HBA), and the like is particularly preferred.

In an embodiment in which the monomer component contains $C_{4-10}$ alkyl (meth)acrylate, and further contains one or both of acrylic acid and a hydroxy group-containing monomer, the preferable content of $C_{4-10}$ alkyl (meth)acrylate in the monomer component may be 60% by weight or more, more preferably, 70% by weight or more, and it may be 80% of weight or more for example. Moreover, 99% by weight or less is preferable, 97% by weight or less is more preferable, and the content may be, for example, 94% by weight or less. Moreover, when the monomer component contains acrylic acid, the content thereof may be 0.1% by weight or more for example, preferably 0.5% of weight or more, and more preferably 1.0% by weight or more, and furthermore, may be 25% of weight or less for example, preferably 20% by weight or less, and may be 10% by weight or less. When the monomer component contains a hydroxyl group-containing monomer, the content thereof may be 0.01% by weight or more for example, preferably 0.05% by weight or more, and furthermore, may be 15% by weight or less for example, preferably 10% by weight or less, and may be 5% by weight or less, or may be 3% by weight or less, or may be 1% by weight or less. It is more preferable that the monomer component contains $C_{4-10}$ alkyl (meth)acrylate, and further contains both of acrylic acid-containing monomer and a hydroxyl group-containing monomer.

The monomer raw material used for preparing the acrylic polymer may contain a secondary monomer other that the abovementioned functional group-containing monomers for the purpose of enhancing the cohesive force of the acrylic polymer.

Non-limiting specific examples of the secondary monomer include the following.

Alkoxy group-containing monomers: for example, alkoxyalkyl (meth)acrylates such as 2-methoxyethyl (meth)acrylate, 3-methoxypropyl (meth)acrylate, 2-ethoxyethyl (meth)acrylate, and the like; alkoxy(poly)alkylene glycol (meth)acrylates such as methoxyethylene glycol (meth)acrylate, methoxypolyethylene glycol (meth)acrylate, methoxypolypropylene glycol (meth)acrylate, and the like.

Vinyl esters: for example, vinyl acetate, vinyl propionate and the like.

Vinyl ethers: for example, vinyl alkyl ethers such as methyl vinyl ether, ethyl vinyl ether, and the like.

Aromatic vinyl compounds: for example, styrene, a-methyl styrene, vinyl toluene, and the like.

Olefins: for example, ethylene, butadiene, isoprene, isobutylene, and the like.

(Meth)acrylic acid esters having an alicyclic hydrocarbon group: for example, alicyclic hydrocarbon group-containing (meth)acrylates such as cyclopentyl (meth)acrylate, cyclohexyl (meth)acrylate, isobornyl (meth)acrylate, dicyclopentanyl (meth)acrylate, adamantyl (meth)acrylate, and the like.

Aromatic ring-containing (meth)acrylates: for example, aryl (meth)acrylates such as phenyl(meth)acrylate and the like; aryloxyalkyl (meth)acrylates such as phenoxyethyl (meth)acrylate and the like; and aryl alkyl (meth)acrylates such as benzyl (meth)acrylate and the like.

In addition to this, heterocyclic (meth)acrylates such as tetrahydrofurfuryl (meth)acrylate and the like; halogen atom-containing monomers such as vinyl chloride, fluorine atom-containing (meth)acrylate; organosiloxane chain-containing monomers such as silicone (meth)acrylate and the like; and (meth)acrylic acid ester obtained from terpen compound derivative alcohol, etc.

Such secondary monomers can be used solely or in combination of two or more. The amount of such other secondary monomers may be selected appropriately according to the purpose and application, and is not particularly limited. For example, it is preferable that the amount of the secondary monomer is 20% by weight or less (for example, 2% by weight to 20% by weight, and typically, 3% by weight to 10% by weight) in the total monomer raw material of the acrylic polymer.

The method for polymerizing a monomer raw material is not particularly limited, and various polymerization methods known as methods for synthesis of acrylic polymers such as a solution polymerization method, an emulsion polymerization method, a bulk polymerization method, a suspension polymerization method, and the like may be adopted appropriately. For example, the solution polymerization method can be preferably adopted. As a method for supplying a monomer at the time of carrying out the solution polymerization, a batch charging method in which all the monomer raw material is fed at a time, a continuous supply (dripping) method, and a divided feeding (dripping) method can be adopted appropriately. A solvent to be used in the solution polymerization (polymerization solvent) can be selected appropriately from conventionally known organic solvents. For example, a solvent of any one type or a mixed solvent of two or more than two types selected from aromatic compounds such as toluene and the like (typically aromatic hydrocarbons); esters such as ethyl acetate, butyl acetate, and the like; aliphatic or alicyclic hydrocarbons such as hexane, cyclohexane, and the like; halogenated alkanes such as 1,2-dichloroethane and the like; lower alcohols such as isopropyl alcohol (for example, monohydric alcohols having number of carbon atoms from 1 to 4) and the like; ethers such as tert-butyl methyl ether and the like; ketones such as methyl ethyl ketone and the like, can be used. The polymerization temperature can be appropriately selected according to the species of monomer and solvent used and the species of polymerization initiator used, and may be set to about 20° C.~120° C. (typically 40° C. to 80° C.). By the solution polymerization, a polymerization reaction solution in which a polymer of the monomer raw material is dissolved in the polymerization solvent can be obtained. The PSA composition used for forming the PSA layer can be preferably manufactured by using the abovementioned polymerization reaction solution.

In the polymerization, a known or commonly used thermal polymerization initiator or photopolymerization initiator may be used according to the polymerization method, polymerization mode, and the like. Examples of the thermal polymerization initiator include an azo polymerization initiator, a peroxide initiator, a redox initiator obtained by combining a peroxide and a reducing agent, a substituted ethane initiator, and the like. Examples of the photopolymerization initiator include an α-ketor photoinitiator, an acetophenone photoinitiator, a benzoin ether photoinitiator, a ketal photoinitiator, an aromatic sulphonyl chloride photoinitiator, a photoactive oxime photoinitiator, a benzophenone photoinitiator, a thioxanthone photoinitiator, an acylphosphine oxide photoinitiator, and the like. One species alone or an appropriate combination of two or more than two species of polymerization initiators can be use.

The amount of the polymerization initiators used may be an amount used normally, and for example, can be selected from a range of about 0.005 parts by weight to 1 part by weight (typically 0.01 parts by weight to 1 part by weight) with respect to 100 parts by weight of the total monomer raw material.

The PSA composition disclosed herein may further contain a polymer other than the acrylic polymer as a secondary polymer according to the requirement. As the abovementioned secondary polymer, polymers other than the acrylic polymers from among the various polymers exemplified as polymers that may be contained in the PSA layer can be cited as a preferable example. When the PSA composition disclosed herein contains a secondary polymer in addition to the acrylic polymer, it is appropriate to make the secondary polymer content to less than 100 parts by weight with respect to 100 parts by weight of the acrylic polymer. The secondary polymer content of 50 parts by weight or less is preferable, 30 parts by weight or less is more preferable, and 10 parts by weight or less is even more preferable. The secondary polymer content may be 5 parts by weight or less with respect to 100 parts by weight of the acrylic polymer, or may be 1 part by weight or less with respect to 100 parts by weight of the acrylic polymer. The technique disclosed herein can be preferably implemented, for example, when 99.5% by weight to 100% by weight of the polymer contained in the PSA is an acrylic polymer.

The molecular weight of the base polymer (typically, an acrylic polymer) is not particularly limited, and may be set in an appropriate range in accordance with the required performance. It is appropriate that the weight average molecular weight (Mw) of the base polymer (typically, an acrylic polymer) is $5 \times 10^4$ or more, preferably about $15 \times 10^4$ or more, more preferably about $30 \times 10^4$ or more, and even more preferably about $45 \times 10^4$ or more can be appropriately selected and used. An upper limit of the abovementioned Mw is not particularly limited, and may be about $150 \times 10^4$ or less (preferably about $100 \times 10^4$ or less, for example $80 \times 10^4$ or less). By the Mw being within the abovementioned range, it is easy to adjust the elastic modulus of the PSA in a preferable range, and moreover to exhibit a favorable cohesive force.

Although it is not particularly limited, the dispersity (Mw/Mn) expressed as a ratio of the weight average molecular weight (Mw) to the number average molecular weight (Mn) of the base polymer (typically, the acrylic polymer) is 1 or more in principle, and may be 2.0 or more from the viewpoint of ease of synthesis and productivity, and preferably 3.0 or more. In some preferred embodiments, the dispersity of the base polymer may be, for example, 4.0 or higher, 4.5 or higher, and even 4.8 or higher. By setting the dispersity (Mw/Mn) of the base polymer to a predetermined value or higher, at a solvent-free and easy to coat melt viscosity, it is easy to obtain a PSA layer which exhibits a favorable adhesiveness (adhesive strength, tackiness etc.). An upper limit of the dispersity of the base polymer is not particularly limited. In some embodiments, it is appropriate that the dispersity of the base polymer is 10 or less (for example, 9.0 or less), preferably 8.0 or less, more preferably 7.0 or less, and may be 6.0 or less, and may be even 5.5 or less. By setting the dispersity (Mw/Mn) of the base polymer to a predetermined value or lower, a PSA layer showing a favorable cohesiveness can be formed while suppressing a rise in the melt viscosity due to the presence of a substance having a high molecular weight.

Here, Mw and Mn of the base polymer (typically, an acrylic polymer) refers to polystyrene equivalent values obtained on the basis of gel permeation chromatography measurement. As the gel permeation chromatography measurement device, for example, a model "HLC-8120 GPC" manufactured by TOSOH Corporation can be used.

(Tackifier)

The PSA composition disclosed herein is characterized by containing a tackifier (hereinafter, referred to as "tackifier A") represented by the following general formula (1).

$$R—[(CH_3)_2C_6H_2—(CH_2O)_n—CH_2]_m—OH \qquad (1);$$

(in the general formula (1), R is a hydrogen atom or a hydroxyl group, m is 9 to 16, and n is 0 to 3.)

When the tackifier A represented by the general formula (1) is used, it is easy to realize a PSA composition in which the rapid gelation at the time of heating and melting is suppressed. In particular, by using the tackifier A in combination with an isocyanate crosslinking agent to be described later, the effect of suppressing gelation at the time of heating and melting is easy to be exhibited. Solely one species or a combination of two or more species of the tackifier A can be used.

The reason why the tackifier A represented by the general formula (1) suppresses the rapid gelation when the PSA composition is not particularly limited, but can be explained as follows, for example. A cross-linking reaction AB when a crosslinking agent (typically an isocyanate crosslinking agent) is used includes a reaction A in which the crosslinking agent crosslinks the base polymer and a reaction B in which the crosslinking agents are bonded to each other in the presence of water to form a polymer network. On the other hand, the crosslinking agent can also react with the tackifier A. Hereinafter, the reaction between the crosslinking agent and the tackifier A is referred to as a reaction X.

It is considered that when the PSA composition containing the crosslinking agent and the tackifier A is heated, the crosslinking reaction AB and the reaction X progress in a competitive state. Here, under the temperature condition of a relatively high temperature such as a temperature at which the PSA composition melts, typically about 90° C. to 100° C., under the temperature condition approximately near 100° C. for example, the reaction X is predominant. On the other hand, it is considered that under the temperature condition of a lower temperature, typically about 30° C. to 50° C., under the temperature condition approximately near 40° C. for example, the crosslinking reaction AB progresses predominantly. Therefore, at the time of heating and melting the PSA composition at a relatively high temperature, typically about 90° C. to 110° C., approximately at 100° C. for example, by the reaction X progressing predominantly, the progress of the crosslinking reaction is suppressed, and generation of a gelled substance can be suppressed. Moreover, after forming a film by melt-extrusion etc. of the PSA composition that was heated and melted, when the film formed is aged under the temperature condition of a relatively low temperature, typically at about 30° C. to 50° C., approximately 40° C. for example, it is considered that the cross-linking reaction AB of the PSA composition progresses, and a PSA layer having an adequate degree of crosslinking can be formed.

In a preferred embodiment of the technique disclosed herein, the tackifier A is a tackifier for which, in the general formula (1), m is 9 to 16 (for example, 10 to 15), and more preferably is a tackifier for which m is 11 to 14. Moreover, in a preferred embodiment, the tackifier A is a tackifier for which, in the general formula (1), n is 0 to 3 (for example, 0 to 2). Furthermore, in a preferred embodiment of the PSA composition disclosed herein, the tackifier A is a mixture containing one species, or two or more than two species selected from compounds for which R in the general formula (1) is a hydrogen atom together with one species, or two or more than two species selected from compounds for which R is a hydroxyl group. The tackifier A disclosed herein may be a xylene-based tackifier. Trade name "NIKANOL (registered trademark)" manufactured by Fudoh Company Limited, and the like are exemplified as a commercially available xylene-based tackifier.

From the viewpoint of suppressing gelation when the PSA composition is heated and melted, it is appropriate that the content of the tackifier A with respect to 100 parts by weight of the base polymer is usually 0.1 parts by weight or more, preferably 0.5 parts by weight or more, and even more preferably can be 1 part by weight or more. In some preferred embodiments, the content of the tackifier A, with respect 100 parts by weight of the base polymer may be 3 parts by weight or more, 5 parts by weight or more, or 7 parts by weight or more. From the viewpoint of improving the adhesive strength of the PSA layer, it is appropriate that the content of the tackifier A with respect to 100 parts by weight of the base polymer is usually 20 parts by weight or less, preferably less than 15 parts by weight, and even more preferably can be 10 parts by weight or less. When the content of the tackifier A is excessively large, the crosslinking reaction at the time of aging may be hindered and pressure-sensitive adhesive properties of the PSA layer may be degraded. In some preferred embodiments, the content of the tackifier A with respect to 100 parts by weight of the base polymer may be 8 parts by weight or less, 6 parts by weight or less, or even 2 parts by weight or less.

A hydroxyl value of the tackifier A is not particularly limited. The hydroxyl value of the tackifier A according to a preferred embodiment is 60 mgKOH/g or lower, preferably 50 mgKOH/g or lower, and more preferably 35 mgKOH/g or lower (for example, 30 mgKOH/g or lower). A lower limit of the hydroxyl value of the tackifier A is not particularly limited, 10 mgKOH/g or higher is usually appropriate, and is preferably 15 mgKOH/g or higher (for example, 20 mgKOH/g or higher).

Here, values measured by potentiometric titration specified in JIS K0070:1992 can be adopted. The practical method of measurement is as shown below.

[Method for Measuring Hydroxyl Value]

1. Reagent
   (1) As an acetylating reagent, a reagent obtained by adding pyridine to approximately 12.5 g (approximately) 11.8 mL of acetic acid anhydride (anhydrous acetic acid) to make the total quantity 50 ml, and stirring adequately is used. Or, a reagent obtained by adding pyridine to approximately 25 g (approximately 23.5 mL) of acetic acid anhydride (anhydrous acetic acid) to make the total quantity 100 mL, and stirring adequately is used.
   (2) As a measuring reagent, 0.5 mol/L potassium hydroxide ethanol solution is used.
   (3) In addition to this, toluene, pyridine, ethanol, and distilled water are arranged.

2. Operation
   (1) 5 mL of the acetylating reagent and 10 mL of pyridine are added to approximately 2 g of a sample weighed precisely in a flat-bottomed flask, and an air-cooling tube (pipe) is mounted (loaded).
   (2) After heating the flask in a bath at 100° C. for 70 minutes, the flask is allowed to cool. After stirring upon adding 35 mL of toluene as a solvent from an upper portion of the cooling tube (condenser tube), and then stirring upon adding 1 mL of distilled water, acetic acid anhydride (anhydrous acetic acid) is decomposed. For decomposing completely, the resultant is heated once again in the bath for 10 minutes, and allowed to cool.
   (3) The cooling tube is washed with 5 mL of ethanol, and is removed. Next, 50 mL of pyridine is added as a solvent, and stirred.
   (4) 25 mL of a 0.5 mol/L potassium hydroxide ethanol solution is added by using a transfer pipet.

(5) Potentiometric titration is carried out with the 0.5 mol/L potassium hydroxide ethanol solution. A point of inflection of a titration curve obtained is let to be the end point.

(6) For a blank test, (1) to (5) are carried out without adding the sample.

3. Calculation

The hydroxyl value is calculated by the following general formula.

$$\text{Hydroxyl value (mgKOH/g)} = [(B-C) \times f \times 28.05]/S + D$$

Here,

B is a quantity (mL) of the 0.5 mol/L potassium hydroxide ethanol solution used for the blank test, C is a quantity (mL) of the 0.5 mol/L potassium hydroxide ethanol solution used for the sample, f is a factor of the 0.5 mol/L potassium hydroxide ethanol solution, S is a weight (g) of the sample, D is an acid value (number), and 28.05 is one-half of the molecular weight 56.11 of the potassium hydroxide.

The PSA composition disclosed herein may further contain another tackifier in addition to the tackifier A, as the tackifier. Such another tackifier is not particularly limited, and examples thereof include rosin-based tackifiers, terpene-based tackifiers, phenol-based tackifiers, hydrocarbon-based tackifiers, ketone-based tackifiers, polyamide-based tackifiers, epoxy-based tackifiers, and elastomer-based tackifiers. Solely one species of tackifier, or two or more than two species of tackifiers can be used in combination.

Examples of rosin-based tackifier include unmodified rosins (raw rosins) such as gum rosin, wood rosin, tall oil rosin, and the like, modified rosins obtained by modifying the unmodified rosins by polymerization, disproportionation, and hydrogenation (polymerized rosins, stabilized rosins, disproportionated rosins, fully hydrogenated rosins, partially hydrogenated rosins, and other chemically modified rosins), various rosin derivatives, and the like.

Examples of the rosin derivatives include rosin phenol-based resin obtained by adding phenol to rosins (unmodified rosins, modified rosins, various rosin derivatives etc.) with an acid catalyst, and thermally polymerizing;

rosin ester-based resins such as ester compounds of rosin (unmodified rosin esters) obtained by esterifying the unmodified rosin by an alcohol, and ester compounds of modified rosins obtained by esterifying modified rosins such as polymerized rosins, stabilized rosins, disproportionated rosins, fully hydrogenated rosins, and partially hydrogenated rosins by an alcohol (polymerized rosin ester, stabilized rosin ester, disproportionated rosin ester, fully hydrogenated rosin ester, partially hydrogenated rosin ester and the like):

unsaturated fatty acid modified rosin-based resins obtained by modifying the unmodified rosins or modified rosins (polymerized rosins, stabilized rosins, disproportionated rosins, fully hydrogenated rosins, partially hydrogenated rosins etc.) by an unsaturated fatty acid;

unsaturated fatty acid modified rosin ester-based resins obtained by modifying rosin ester-based resins by an unsaturated fatty acid;

rosin alcohol-based resins obtained by carrying out reduction treatment on a carboxyl group in unmodified rosin, modified rosin (polymerized rosins, stabilized rosins, disproportionated rosins, fully hydrogenated rosins, hydrogenated rosins etc.), unsaturated fatty acid modified rosin-based resins, and unsaturated fatty acid modified rosin ester-based resins; and metal salts of rosin-based resins such as various rosin derivatives etc. (particularly rosin ester-based resins), unmodified rosins, and modified rosins.

Examples of terpene-based tackifier include terpene-based resins such as α-pinene polymers, β-pinene polymers, dipentene polymers, modified terpene-based resins (such as terpene phenol-based resins, styrene-modified terpene-based resins, aromatic modified terpene-based resins, hydrogenated terpene-based resins, and the like) obtained by modifying the terpene-based resins (such as phenolic modification, aromatic modification, hydrogenation modification, hydrocarbon modification etc.) and the like.

Examples of the phenol-based tackifier include condensates (such as alkylphenol-based resins, xylene formaldehyde-based resins, and the like) of various phenols (such as phenol, m-cresol, 3,5-xylenol, p-alkylphenol, resorcin, and the like) with formaldehyde, resol obtainable by base-catalyzed addition of the phenols and the formaldehyde, novoloc obtainable by acid-catalyzed condensation of phenols and formaldehyde, and the like.

Examples of the hydrocarbon-based tackifier include various hydrocarbon resins such as aliphatic hydrocarbon resins, aromatic hydrocarbon resins, alicyclic hydrocarbon resins, aliphatic/aromatic petroleum resins (styrene olefin-based copolymers etc.), aliphatic/alicyclic petroleum resins, hydrogenated hydrocarbon resins, coumarone-based resins, coumarone indene-based resins, and the like.

The total amount of tackifier to be used in a case of using another tackifier in addition to the tackifier A is not particularly limited, and can be set so as to exhibit an appropriate adhesive performance according to the purpose and application. The content of the overall tackifier with respect to 100 parts by weight of the base polymer can be set to, for example, 0.2 parts by weight or more, 1 part by weight or more, or 2 parts by weight or more, and moreover, the content can be 30 parts by weight or less, 20 parts by weight or less, or 15 parts by weight or more. The PSA composition disclosed herein may not contain a tackifier other than the tackifier A.

(Crosslinking Agent)

In a technique disclosed herein, the PSA composition includes (contains) an isocyanate crosslinking agent as the crosslinking agent. By the isocyanate crosslinking agent being used together with the abovementioned tackifier A, the rapid gelation at the time of heating and melting the PSA composition is suppressed, and there is a tendency of raising the degree of cross-linking of the PSA in the process of aging of the PSA layer under a lower temperature condition.

As the isocyanate crosslinking agent, a polyfunctional isocyanate compound which is bifunctional or higher can be used. Examples of the isocyanate crosslinking agent include aromatic isocyanates such as tolylene diisocyanate, xylene diisocyanate, polymethylene polyphenyl diisocyanate, tris (p-isocyanatephenyl)thiophosphate, diphenylmethane diisocyanate, and the like; alicyclic isocyanates such as isophorone diisocyanate, and the like; and aliphatic isocyanates such as hexamethylene diisocyanate and the like. As commercially available products, isocyanate adducts such as trimethylpropane/tolylene diisocyanate trimer adduct (trade name "Coronate L", manufactured by TOSOH Corporation), trimethylolpropane/hexamethylene diisocyanate trimer adduct (trade name "Coronate HL", manufactured by TOSOH Corporation), and isocyanurate of hexamethylene diisocyanate (trade name "Coronate HX", manufactured by TOSOH Corporation).

The content of the isocyanate crosslinking agent is not particularly limited. It is appropriate that an amount used of the isocyanate crosslinking agent with respect to 100 parts by weight of the base polymer is usually 15 parts by weight or less, preferably 12 parts by weight or less, and more preferably 10 parts by weight or less. The amount used may be less than 7 parts by weight, or even less than 5 parts by weight. The lower limit of the content of the isocyanate crosslinking agent is not particularly limited. From the viewpoint of improving the adhesive performance, it is appropriate that the amount used of the isocyanate crosslinking agent with respect to 100 parts by weight of the base polymer (for example acrylic polymer) is usually 0.01 parts by weight or more, preferably 0.05 parts by weight or more, more preferably 0.1 parts by weight or more, and even more preferably 0.2 parts by weight or more. The amount used may be 0.5 parts by weight or more, or 0.5 parts by weight or more, or 1 part by weight or more, or 2 parts by weight or more, or 3 parts by weight or more, or 3.5 parts by weight or more, or 4 parts by weight or more.

The PSA composition disclosed herein may further contain another crosslinking agent other than the isocyanate crosslinking agent. Examples of a crosslinking agent that may be used as the crosslinking agent other than the isocyanate crosslinking agent include an epoxy crosslinking agent, an oxazoline crosslinking agent, an aziridine crosslinking agent, a carbodiimide crosslinking agent, a melamine crosslinking agent, a urea crosslinking agent, a metal alkoxide crosslinking agent, a metal chelate crosslinking agent, a metal salt crosslinking agent, a hydrazine crosslinking agent, amine crosslinking agent, and the like. Solely one species or a combination of two or more species of these crosslinking agents can be used.

As the epoxy crosslinking agent, a crosslinking agent having two or more epoxy groups in one molecule can be used without being particularly limited. An epoxy crosslinking agent having three to five epoxy groups in one molecule is preferable. Specific examples of the epoxy crosslinking agent include N, N, N', N'-tetraglycidil-m-xylenediamine, 1,3-bis(N,N-diglycidilaminomethy)cyclohexane, 1,6-hexanediol diglycidyl ether, polyethylene glycol diglycidyl ether, polyglycerol polyglycidyl ether, and the like. Commercially available products of epoxy crosslinking agent include trade names "TETRAD-X" and "TETRAD-C" manufactured by Mitsubishi Gas Chemical Co., Ltd., trade name "Epiclon CR-5L" manufactured by DIC Corporation, trade names "Denacol EX-512", "Denacol EX-411", and "Denacol EX-321" manufactured my "Nagase ChemteX Corporation", trade name "1EPIC-G" manufactured by Nissan Chemical Corporation, and the like.

The total amount used of the overall crosslinking agents is not particularly limited, and may be set appropriately such that the desired effect of use can be achieved. From the viewpoint of the tightness of adhesion to the adherend and reliability of bonding, it is appropriate that the amount used of the overall crosslinking agents with respect to 100 parts by weight of the base polymer (for example, the acrylic polymer) is usually about 15 parts by weight or less, preferably 12 parts by weight, and more preferably 10 parts by weight. The amount used of the overall crosslinking agents may be less than 7 parts by weight, or may be less than 5 parts by weight. The lower limit of the total amount used of the overall crosslinking agents is not particularly limited. From the viewpoint of improving the adhesive performance, it is appropriate that the amount of use of the overall crosslinking agents with respect to 100 parts by weight of the base polymer (for example, the acrylic polymer) is usually 0.01 parts by weight or more, preferably 0.05 parts by weight or more, more preferably 0.1 parts by weight or more, even more preferably 0.1 parts by weight or more, and all the more preferably 0.2 parts by weight or more. The amount of use of the overall crosslinking agent may be 0.5 parts by weight or more, or may be 1 part by weight or more, or may be 2 parts by weight or more, or may be 3 parts by weight or more.

A crosslinking catalyst may be used in order to allow the reaction of any one of the abovementioned crosslinking agents to progress more effectively. As the crosslinking catalyst, for instance, a tin-based catalyst (particularly, dioctyl tin dilaurate) or an amine-based catalyst (such as 1-isobutyl-2-methyl imidazole can be preferably used. The amount of the crosslinking catalyst used is not particularly limited, but can be for example, approximately 0.0001 parts by weight to 1 part by weight with respect to 100 parts by weight of the base polymer.

(Polyfunctional Monomer)

A polyfunctional monomer may be used according to the requirement in the preparation of the PSA composition disclosed herein. The polyfunctional monomer being used instead of the abovementioned crosslinking agent or in combination with the crosslinking agent may be useful for the purpose such as adjusting the cohesive force. Examples of the polyfunctional monomer include ethylene glycol di(meth)acrylate, propylene glycol di(meth)acrylate, polyethylene glycol di(meth)acrylate, polypropylene glycol di(meth)acrylate, neopentyl glycol di(meth)acrylate, pentaerythriotol di(meth)acrylate, pentaerythriotol tri(meth)acrylate, dipentaerythriotol hexa(meth)acrylate, ethylene glycol di(meth)acrylate, 1,6-hexanediol di(meth)acrylate, 1,12-dodecanediol di(meth)acrylate, trimethylol propane tri(meth)acrylate, tetramethylol methane tri(meth)acrylate, allyl (meth)acrylate, vinyl (meth)acrylate, divinyl benzene, epoxy acrylate, polyester acrylate, urethane acrylate, butyl diol(meth)acrylate, hexyl diol di(meth)acrylate and the like. Examples of preferable polyfunctional monomers among these include trimethylol propane tri(meth)acrylate, 1,6-hexanediol di(meth)acrylate, and dipentaerythritol hexa(meth)acrylate. Solely one species or two or more than two species in combination of the polyfunctional monomer can be used. The amount of the polyfunctional monomer varies according to the molecular weight thereof, the number of functional groups etc., but usually, the range of about 0.01 parts by weight to 3.0 parts by weight with respect to 100 parts by weight of the base polymer is appropriate. The PSA composition disclosed herein can be preferably carried out without including the polyfunctional monomer practically.

Moreover, the PSA composition in the technique disclosed herein may contain according to the requirement, a known additive agent that can be used in the PSA, such as a levelling agent, a plasticizer, a softening agent, a colorant (dye, pigments etc.), an antistatic agent, an antiaging agent, an ultraviolet absorber, an antioxidant, a light stabilizer, an antiseptic agent, and the like as long as the effects of the present invention are not significantly hindered.

<Formation of PSA Layer>

The PSA layer of the PSA sheet disclosed herein may be a PSA layer formed by a hot-melt PSA composition which contains a base polymer (for example, the acrylic polymer), an isocyanate crosslinking agent, and the tackifier A, and other optional components according to the requirement. The PSA composition disclosed herein may be molded in the state of being heated and melted, and thereafter the PSA layer may be formed by undergoing the aging process.

The method for molding the hot-melt PSA composition disclosed herein into a film form or a sheet form is not particularly restricted, and a known appropriate method can be used. The PSA composition disclosed herein may be formed by a method such as a calendar method, a casting method, an inflation extrusion method, a T-die extrusion method, and the like. For instance, in a case of molding the PSA composition disclosed herein in the form of a film by melt extrusion, the PSA composition is heated to a relatively high temperature (typically about 90° C. to 110° C., for example approximately 100° C.), and assumes a highly fluid molten state. Next, the PSA composition in the molten state by being extruded from a mold of an extruder is molded into a film form. Thereafter, the PSA composition molded in the form of a film by being kept under lower temperature conditions (typically about 30° C. to 50° C., for example approximately 40° C.) for a certain fixed time or more (typically, for 12 hours or more, for example 24 hours or more) undergoes aging, and a PSA layer having suitable adhesive properties can be formed.

In the PSA sheet disclosed herein, the thickness of the PSA layer is not particularly limited, and can be appropriately selected in accordance with the purpose. Usually, about 5 µm to 1000 µm thickness of the PSA layer is appropriate, and from the viewpoint of tight adhesiveness, the thickness is preferably about 10 µm or more (for example, 15 µm or more, typically 25 µm or more). The thickness of the PSA layer is preferably about 750 µm or less, more preferably 500 µm or less, and even more preferably 400 µm or less (for example, 300 µm or less, typically 200 µm or less).

<Constitutional Example of PSA Sheet>

According to the technique disclosed herein, a PSA sheet having the PSA layer is provided. The PSA layer typically constitutes at least one surface of the PSA sheet. The PSA sheet may be a PSA sheet with a substrate having a PSA layer on one surface or both surfaces of a substrate (support, base) or may be a PSA sheet not containing a substrate (substrate-less PSA sheet).

The concept of the term PSA sheet here may include what is referred to as a PSA tape, a PSA label, a PSA film, and the like. Moreover, the PSA sheet provided by the present Description may be in a roll or in a flat sheet. Or it may be a PSA sheet in the form processed to various additional shapes.

Figure 2:
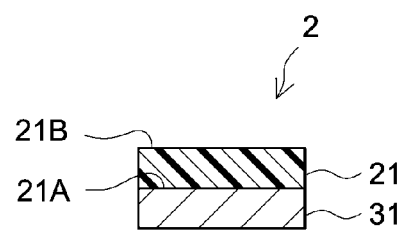
FIG. 2 shows a cross-sectional diagram schematically illustrating the PSA sheet according to another embodiment.

FIG. 1 and FIG. 2 are diagrams showing constitutional examples in a preferred embodiment of the PSA sheet disclosed herein. A PSA sheet 1 shown in FIG. 1 has a constitution in which one surface (a first PSA surface) 21A and the other surface (a second PSA surface) 21B of a substrate-less PSA layer 21 are protected by release liners 31 and 32 respectively, of which at least a PSA surface side is a release surface. A PSA sheet 2 shown in FIG. 2 has a constitution in which one surface (the first PSA surface) 21A of a PSA layer 21 is protected by the release liner 31 of which both surfaces are release surfaces, and the constitution can be made such that when this is wound around, by the other surface (the second PSA surface) 21B of the PSA layer 21 making a contact with a rear surface of the release liner 31, the other surface 21B is also protected by the release liner 31.

By attaching a non-release substrate to one PSA surface of the substrate-less double-sided PSA sheet or the PSA sheet with substrate, the double-sided PSA sheet can be used as a single-sided PSA sheet with substrate.

The PSA sheet before use (before attaching to the adherend), as shown in FIGS. 1 and 2 for instance, may be in the form of a PSA sheet with the release liner having the PSA surface protected by the release liner. The release liner is not particularly limited and a release liner having a surface of a liner substrate such as a resin film or paper etc. subjected to peeling treatment, a release liner made of a material having low adhesiveness such as a fluorine-based polymer (such as polytetrafluoroethylene etc.) and a polyolefin resin (such as polyethylene and polypropylene etc.) and the like can be bused. For instance, a peeling agent such as a silicone-based peeling agent, a long-chain alkyl-based peeling agent, and the like can be used for the peeling treatment. In some embodiments, the resin film subjected to peeling treatment may be preferably adopted as the release liner.

When the PSA sheet disclosed herein is in the form of a double-sided PSA sheet having the first PSA surface and the second PSA surface, the PSA (first PSA) constituting the first PSA surface and the PSA (second PSA) constituting the second PSA surface may have the same composition or different composition. A substrate-less double-side PSA sheet having different composition for the first PSA surface and the second PSA surface can be, for example, realized by a PSA layer having a multi-layered structure in which two of more PSA layers having different composition are laminated directly (not via a substrate).

<Substrate>

In a PSA sheet with substrate of a single-sided PSA type or a double-sided PSA type, various substrates in the form of a sheet such as a resin film, a paper, a cloth, a rubber sheet, a foam sheet, a metal foil, a composite thereof, and the like can be used as a substrate supporting the PSA layer. The substrate may be single-layered or multi-layered with same species or different species of substrates. In the present Description, single-layered refers to a layer made of the same composition, and the layer made of the same composition includes a form in which a plurality of layers having the same composition are laminated.

In a preferred embodiment, a substrate having a resin sheet as a main component (resin film substrate) may be used. Examples of the resin constituting the substrate include polyolefin resins such as low-density polyethylene, linear low-density polyethylene, medium-density polyethylene, high-density polyethylene, ultra-low-density polyethylene, random copolymerized polypropylene, block copolymerized polypropylene, homopolyprolene, polybutene, polymethyl pentene, ethylene-vinyl acetate copolymer (EVA), ionomer, ethylene (meth)acrylic acid ester (random, alternating) copolymer, ethylene-butene copolymer, ethylene-hexane copolymer, and the like; polyurethane; polyesters such as polyethylene terephthalate (PET), polyethylene naphthalate, polybutylene terephthalate (PBT), and the like; polycarbonates; polyimides; polyether ether ketones; polyether imides; polyamides such as aramid, total aromatic polyamide, and the like; polyphenyl sulfide; fluororesins; polyvinyl chloride; polyvinylidene chloride; cellulose resins; silicone resins; and the like. Solely one species or a combination of two or more species of resins may be used for formation of the overall or a part of the substrate (for example, any one layer in a substrate having a laminated structure of two or more layers).

The substrate may have various additives such as fillers (inorganic fillers, organic fillers, etc.), antiaging agents, antioxidants, ultraviolet absorbers, antistatic agents, lubricants, plasticizers, colorants (pigments, dyes, etc.) added thereto according to the requirement.

The substrate can be manufactured by an arbitrary appropriate method. For instance, the substrate can be manufactured by a known method such as the calendar method, the casting method, the inflation extrusion method, the T-die extrusion method, and the like. Moreover, the substrate may be manufactured by performing a stretching treatment according to the requirement.

For the purpose of improving the tight adhesiveness with the PSA layer and the retention of the PSA layer, a known or a commonly used surface treatment, for example, a physical treatment such as a corona discharge treatment, a plasma treatment, a sand mat processing treatment, an ozone exposure treatment, a flame exposure treatment, a high voltage shock treatment, an ionized radiation treatment, and the like; a chemical treatment such as an acid treatment, an alkali treatment, a chromic acid treatment, and the like; an easy adhesion treatment by a coating agent (undercoating agent), and the like may have been performed on a surface of the substrate on the side of the PSA layer. Moreover, a conductive vapor-deposited layer containing a metal, an alloy, an oxide thereof, or the like may be provided on the surface of the substrate for the purpose of imparting antistatic ability In some preferred embodiments, an undercoat layer is provided on the surface of the substrate on the side of the PSA layer. In other words, an undercoat layer may be disposed between the substrate and the PSA layer. A material forming the undercoat layer is not particularly limited, and one species or two or more species of resins such as a urethane (polyisocyanate) resin, a polyester resin, an acrylic resin, a polyamide resin, a melamine resin, an olefin resin, a polystyrene resin, an epoxy resin, a phenol resin, an isocyanurate resin, a polyvinyl acetate resin, and the like may be used. In a case of providing a PSA layer such as an acrylic PSA layer on a resin film substrate via an undercoat layer, a polyester-based, a urethane-based, or an acrylic undercoat layer is preferable. In a case of providing an acrylic PSA layer on a polyester-based substrate such as a PET film via an undercoat layer, a polyester-based undercoat layer is particularly preferable. The thickness of the undercoat layer is not particularly limited and may generally be in the range of about 0.1 µm to 10 µm (for example, 1 µm to 3 µm, typically 0.1 µm to 1 µm). The undercoat layer may be formed by using a known or commonly used coater such as a gravure roll coater, a reverse roll coater, and the like.

In a case in which the PSA sheet disclosed herein is a single-sided PSA sheet having the PSA layer provided on one side of the substrate, a release treatment may have been performed by a release treatment agent (rear-surface treatment agent) on a surface (rear surface) of the substrate on which no PSA layer is formed. A rear-surface treatment agent that may be used for forming the rear-surface treatment layer is not particularly restricted, and a silicone-based rear-surface treatment agent, a fluorine-based rear-surface treatment agent, a long-chain alkyl-based rear-surface treatment agent, and other known and commonly used treatment agents can be used according to the purpose and application.

The thickness of the substrate is not particularly limited, and it can be appropriately selected according to the purpose, but generally, the thickness may be about 2 µm to 800 µm. From the viewpoint of processability and handleability of the PSA sheet, it is appropriate that the thickness of the substrate is 5 µm or more, and preferably 10 µm or more or 200 µm or more. The thickness of the substrate may be 30 µm or more, or may be 40 µm or more. Moreover, from the viewpoint of flexibility, it is appropriate that the thickness of the substrate is usually 300 µm or less, and preferably 200 µm or less. The thickness of the substrate may be 150 µm or less, or 125 µm or less, and may be 80 µm or less, or 60 µm or less.

The total thickness of the PSA sheet (may include the PSA layer and the substrate, but does not include the release liner) disclosed herein is not particularly limited, and it is appropriately in the range of about 10 µm to 1200 µm. Taking into consideration the tight adhesiveness and handleability, it is preferable that the total thickness of the PSA sheet is in the range of about 15 µm to 300 µm, and it is more preferable that the total thickness is in the range of about 20 µm to 200 µm.

Some examples related to the present invention will be described below, but the present invention is not intended to be limited to the description of these examples. Note that, in the following description, the term "part" is by weight unless otherwise specified.

Example 1

(Preparation of PSA Composition)

In a reaction vessel equipped with a Leibig cooler, a nitrogen infusing tube, a thermometer, a dropping funnel, and a stirrer, 100 parts of n-butyl acrylate (BA) as a monomer raw material, 2 parts of acrylic acid (AA), 8 parts of vinyl acetate, 0.1 part of 2-hydroxy ethyl acrylate (HEA), and 0.2 parts of 2,2'-azobisisobutyronitrile (AIBN) as a polymerization initiator were added to 172 parts of a mixed solvent of toluene and ethyl acetate as a polymerization solvent (toluene:ethyl acetate=1:1 on a weight basis). Next, after carrying out nitrogen reflux at room temperature for one hour, the temperature was raised, and solution polymerization was carried out at 58° C. for six hours. Thereafter, the temperature was raised further, and a first aging reaction was carried out at 65° C. for two hours, and then the temperature was raised even further and a second aging reaction was carried out at 72° C. for two hours. Then, the mixture was allowed to cool and a solution of the acrylic polymer A was obtained. The weight average molecular weight (Mw) of the acrylic polymer A was 600,000, and the weight average molecular weight/the number average molecular weight (dispersity) of the acrylic polymer A was 5.0. The content of the polymer with the molecular weight $10 \times 10^4$ or less of the polymer contained in the acrylic polymer A was 20% by weight. The glass transition temperature (Tg) of the acrylic polymer A based on the composition of the monomer raw material is −49° C.

To the solution of the acrylic polymer A, 1 part of a xylene-based tackifier (trade name "Nicanol H-80", manufactured by Fudoh Company Limited was added with respect to 100 parts of the acrylic polymer A, and a mixture solution was obtained. Here, the xylene-based tackifier is a chemical compound represented by the abovementioned general formula (1), and R in the general formula (1) is a mixture of hydrogen atom and a hydroxyl group (same is the case in Examples 2, 3, and 5 described later). A solvent component was recovered from this solution by a desolventizing process and a solvent-free solid mixture was obtained. To the solid mixture obtained, 4.5 parts of isocyanate crosslinking agent (trimethylolpropane/tolylene diisocyanate trimer adduct, trade name "Coronate L" manufactured by TOSOH Corporation, solid content concentration 75% by weight) was added, and was melt-mixed under temperature condition of approximately 100° C. by using a biaxial extruder. The molten resin was discharged from a coater portion of the biaxial extruder, and a resin layer in the form of a sheet was formed. The appearance immediately after the formation of the resin layer was observed, and the gel fraction was measured.

The resin layer formed was subjected to aging at approximately 40° C. for 72 hours, and a PSA layer of the thickness of approximately 50 μm was obtained. The PSA layer obtained was used as a PSA sheet according to the Example 1. That is, the PSA sheet according to the Example 1 is a substrate-less double-side PSA sheet composed of a PSA layer.

Examples 2, 3, and 5

A PSA sheet according to the present example was obtained in the similar manner as in the preparation of the PSA sheet according to the Example 1 except for adding the content shown in table 1 of a xylene-based tackifier (trade name "Nicanol H-80", manufactured by Fudoh Company Limited) with respect to 100 parts of the acrylic polymer A to the solution of the acrylic polymer A.

Example 4

A PSA sheet according to the present example was obtained in the similar manner as in the preparation of the PSA sheet according to the Example 1 except for not adding a tackifier to the solution of the acrylic polymer A.

<Evaluation>

The PSA composition of each example was heated to approximately 100° C., an appearance of the resin layer was visually observed immediately after the melt extrusion (that is, at the time of forming the resin layer) and the presence or absence of a gelled substance was confirmed. Moreover, the gel fraction (initial gel fraction) of the resin layer was measured. Furthermore, after the resin layer was subjected to aging (that is, at the time of forming the PSA layer) by heating the resin layer at approximately 40° C. for 72 hours, the gel fraction (gel fraction after aging) of the PSA layer was measured. The results obtained are shown in Table 1. Moreover, G is shown in the corresponding column of Table 1 when the melt extrusion could be carried out favorably, and P is shown in the corresponding column when the melt extrusion was not favorable. The gel fraction was measured by the following method.

(Measurement of Gel Fraction)

Approximately 0.1 g (weight: W1 [mg]) of sample was collected from the resin layer or the PSA layer to be measured, and was wrapped to be purse-shaped with a porous film (weight: M2 [mg]) made of tetrafluoroethylene resin having an average pore diameter of 0.2 μm, and the opening was tied with a kite string (weight: W3 [mg]) to obtain a wrap. The wrap was placed in a screw tube of 50 mL volume, and the screw tube was filled with ethyl acetate (one screw tube was used for each wrap). After allowing it to stand at room temperature (typically 23° C.) for seven days, the package was removed from the screw tube and dried at 130° C. for two hours. Thereafter, the weight of the package (W4 [mg]) was measured. Then, the gel fraction of the resin layer or the PSA layer was calculated by substituting the values of W1 to W4 in the following formula.

gel fraction [%]=[($W4-W2-W3$)/$W1$]×100

As the porous film made of the tetrafluoroethylene resin, a porous film made of tetrafluoroethylene resin (trade name "Nitoflon (registered trademark)) NTF 1122", manufactured by Nitto Denko Corporation) was used.

[Table 1]

TABLE 1

| | Tackifier | Resin layer | | | PSA layer |
|---|---|---|---|---|---|
| | Content (parts) for 100 parts of base polymer | Gelled substance | Initial gel fraction | Melt extrusion | Gel fraction after aging |
| Example 1 | 1 | Nil | 0% | G | 40% |
| Example 2 | 5 | Nil | 0% | G | 35% |
| Example 3 | 10 | Nil | 0% | G | 27% |
| Example 4 | 0 | Yes | 22% | P | — |
| Example 5 | 15 | Nil | 0% | P | 1% |

As shown in Table 1, in the PSA compositions according to the Examples 1 to 3, and 5, the initial gel fraction immediately after the formation of the resin layer was 0%, and no gelled substance was observed in the resin layer. Whereas, in the PSA composition according to the Example 4, the initial gel fraction immediately after the formation of the resin layer was 22% and the gelled substance was observed in the resin layer. Moreover, according to the PSA compositions of the Examples 1 to 3, the melt extrusion could be carried out favorably.

Moreover, in the PSA compositions according to the Examples 1 to 3, as compared with the PSA composition according to the Example 5, the gel fraction after the aging rose up, and a PSA layer exhibiting improved adhesive properties was achieved.

Although specific embodiments of the present invention have been described in detail above, these are merely for illustrations and do not limit the scope of claims. The art according to the claims includes various modifications and changes made to the specific embodiments illustrated above.

REFERENCE SIGNS LIST

1, 2 PSA sheet
21 PSA layer
21A first PSA surface
21B second PSA surface
31, 32 release liner

The invention claimed is:
1. A hot-melt pressure-sensitive adhesive composition comprising:
    an acrylic polymer as a base polymer;
    an isocyanate crosslinking agent; and
    a tackifier A which is represented by the following general formula (1):

    R—[(CH$_3$)$_2$C$_6$H$_2$—(CH$_2$O)$_n$—CH$_2$]$_m$—OH  (1);

(in the general formula (1), R is a hydrogen atom or a hydroxyl group, m is 9 to 16, and n is 0 to 3, wherein
    a content of the tackifier A with respect to 100 parts by weight of the base polymer is 1 part by weight to 10 parts by weight,
    a degree of dispersion of the acrylic polymer is 3.0 to 9.0 where the degree of dispersion is expressed as a ratio of a weight average molecular weight of the acrylic polymer to a number average molecular weight of the acrylic polymer, and
    the hot-melt pressure-sensitive adhesive composition is solvent-free.
2. The hot-melt pressure-sensitive adhesive composition according to claim 1, wherein in the acrylic polymer, an alkyl (meth)acrylate having an alkyl group with 4 or more and 12 or less carbon atoms at its ester terminus is polymerized in a proportion of 50% by weight or greater.

3. The hot-melt pressure-sensitive adhesive composition according to claim 1, wherein a content of the isocyanate crosslinking agent is 2 parts by weight or more and 10 parts by weight or less with respect to 100 parts by weight of the base polymer.

4. A pressure-sensitive adhesive sheet, comprising:
a pressure-sensitive adhesive layer which is formed of a hot-melt pressure-sensitive adhesive composition according to claim 1.

* * * * *